(12) United States Patent
Lehtovirta et al.

(10) Patent No.: US 11,997,479 B2
(45) Date of Patent: May 28, 2024

(54) KEY DERIVATION FOR NON-3GPP ACCESS

(71) Applicant: TELEFONAKTIEBOLAGET LM ERICSSON (PUBL), Stockholm (SE)

(72) Inventors: Vesa Lehtovirta, Espoo (FI); Christine Jost, Dalby (SE); Helena Vahidi Mazinani, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 265 days.

(21) Appl. No.: 17/434,238

(22) PCT Filed: Feb. 13, 2020

(86) PCT No.: PCT/EP2020/053781
§ 371 (c)(1),
(2) Date: Aug. 26, 2021

(87) PCT Pub. No.: WO2020/178001
PCT Pub. Date: Sep. 10, 2020

(65) Prior Publication Data
US 2022/0150694 A1 May 12, 2022

Related U.S. Application Data (60) Provisional application No. 62/813,440, filed on Mar. 4, 2019.

(51) Int. Cl.
*H04W 12/03* (2021.01)
*H04W 12/037* (2021.01)
(Continued)

(52) U.S. Cl.
CPC ....... *H04W 12/041* (2021.01); *H04W 12/037* (2021.01); *H04W 12/06* (2013.01); *H04W 76/10* (2018.02); *H04W 60/00* (2013.01)

(58) Field of Classification Search
CPC . H04W 12/037; H04W 12/06; H04W 12/041; H04W 12/04; H04W 76/10;
(Continued)

(56) References Cited

U.S. PATENT DOCUMENTS 10,798,767 B2 * 10/2020 Salkintzis ............. H04W 76/11
2010/0303238 A1 12/2010 Cakulev et al.
(Continued)

FOREIGN PATENT DOCUMENTS

EP 2760231 A1 7/2014
WO 2019020193 A1 1/2019

OTHER PUBLICATIONS

EPO Communication dated Sep. 6, 2022 for Patent Application No. 20705347.1, consisting of 10-pages.
(Continued)

*Primary Examiner* — Khawar Iqbal
(74) *Attorney, Agent, or Firm* — Weisberg I.P. Law, P.A.

(57) ABSTRACT

A method for key derivation for non-3GPP access. The method includes determining a particular non-3GPP access type, wherein the particular non-3GPP access type is one of N different particular non-3GPP access types (N>1), and each one of the N particular non-3GPP access types is associated with a unique access type distinguisher value. The method also includes generating (s604) a first access network key using a key derivation function and the unique access type distinguisher value with which the determined particular non-3GPP access type is associated, thereby generating a first access network key for the particular non-3GPP access type.

23 Claims, 8 Drawing Sheets

(51) Int. Cl.
*H04W 12/041* (2021.01)
*H04W 12/06* (2021.01)
*H04W 76/10* (2018.01)
*H04W 60/00* (2009.01)

(58) Field of Classification Search
CPC .... H04W 60/00; H04L 63/162; H04L 9/0866; H04L 2209/80
See application file for complete search history.

(56) References Cited

U.S. PATENT DOCUMENTS

| | | | |
|---|---|---|---|
| 2018/0343249 A1 | 11/2018 | Hahn et al. | |
| 2020/0178076 A1* | 6/2020 | Ben Henda | H04W 12/0471 |
| 2021/0282060 A1* | 9/2021 | Schmidt | H04W 36/1446 |
| 2021/0306849 A1* | 9/2021 | Liu | H04W 76/11 |
| 2021/0321258 A1* | 10/2021 | Salkintzis | H04W 76/11 |
| 2021/0360742 A1* | 11/2021 | Liao | H04W 48/16 |
| 2022/0039178 A1* | 2/2022 | Salkintzis | H04W 12/041 |
| 2022/0046411 A1* | 2/2022 | Bernardos | H04W 48/18 |
| 2022/0053416 A1* | 2/2022 | Salkintzis | H04W 48/18 |
| 2022/0225263 A1* | 7/2022 | Hans | H04W 12/50 |
| 2022/0255936 A1* | 8/2022 | Wang | H04W 88/16 |
| 2022/0295277 A1* | 9/2022 | Salkintzis | H04W 12/069 |
| 2023/0199505 A1* | 6/2023 | Salkintzis | H04W 12/08 726/2 |

OTHER PUBLICATIONS

M. Sajjad et al.; A Comprehensive Review of Enhancements and Prospects of Fast Handovers for Mobile IPV6 Protocol; IEEE Access, vol. 7; Dec. 17, 2018, consisting of 31-pages.

Chinese Office Action with English machine translation dated Mar. 12, 2024 for Patent Application No. 202080018872.4, consisting of 16 pages.

M.M. Sajjad et al.; A Comprehensive Review of Enhancements and Prospects of Fast handovers for Mobile IPV6 Protocol; IEEE Access Multidisciplinary; Rapid Review; Open Access Journal; vol. 7; Jan. 11, 2019, consisting of 31 pages.

* cited by examiner

KEY DERIVATION FOR NON-3GPP ACCESS

PRIORITY CLAIM

This application is a national stage application of International Patent Application No. PCT/EP2020/053781, filed Feb. 13, 2020, which claims priority to U.S. Provisional Patent Application No. 62/813,440, filed Mar. 4, 2019, the disclosure disclosures of which are hereby incorporated in their entirety by reference.

TECHNICAL FIELD

Disclosed are embodiments related key derivation for non-3GPP access.

BACKGROUND

In release 15 (Rel-15) of the 5G system as specified in 3GPP TS 23.501, TS 23.502, and, for security aspects in TS 33.501, an access network key (K_N3IWF) is used to setup Internet Protocol Security (IPSec) security associations (SAs) (i.e., security parameters) for untrusted non-3GPP (N3GPP) access which protect control plane signaling (encryption and integrity) as well as user plane traffic (encryption and integrity) between a user equipment (UE) (i.e., any device capable of wireless communication with an access network) and the non-3GPP access Inter-Working Function (N3IWF).

For the next release (i.e. release 16 (Rel-16)), two more variants of non-3GPP access are endorsed for normative work by the 3GPP SA2 working group (WG) in 3GPP Technical Report (TR) 23.716 v 16.6.0 ("TR 23.716"). These two variants are: (1) Trusted non-3GPP access (the solution concluded for normative work is described in clause 7.1.3.3 of TR. 23.716); and (2) 5G-RG connecting to a W-5GAN, where the 5G-RG acts as a UE and regards the W-5GAN acts as a non-3GPP access node.

For trusted non-3GPP access, an access network key K_TNGF is derived by the Access and Mobility Management Function (AMF) and sent to the Trusted non-3GPP Gateway Function (TNGF) (see the endorsed SA2 solution in TR.23.716). This key is used to setup IPSec SAs in a similar way as for untrusted access, with the exception that no encryption is used, only integrity protection. According to the solution, another type of key for WLAN encryption (TNAP keys) are also derived from the K_TNGF.

The endorsed procedure for 5G-RG registration in 23.716 assumes that the 5G-RG acts as a UE. There are no conclusions on access nodes keys, since this is in the responsibility area of the Broadband Forum (BBF) and has been left for the BBF to decide.

SUMMARY

Certain challenges exist. For example, in the current key hierarchy of the 5G system, there are two types of access network keys which the AMF in the core network derives for the access networks: 1) K_gNB which is given to the 3GPP access network and 2) K_N3IWF which is given to any non-3GPP access network.

Using the current key hierarchy would mean that the same key (K_N3IWF) would be used for different non-3GPP access types to which the UE may be connected (this would mean that KN3IWF=K_TNGF=K_TBD (see FIG. 2)). This scenario, however, imposes the risk that one (possible malicious) access network of a first type (e.g., untrusted access network) could impersonate another access type (e.g., trusted) towards the UE and therefore enable possible fraud cases.

To combat this problem, this disclosure proposes that, for different non-3GPP access types, different keys are derived by the core network and UE. That is, for any given particular type of non-3GPP access network, both the UE and the core network derive a key for that particular access type. For example, when deriving a key for use with a particular type of access network, both the UE and the core network generate the key using the same key derivation function (KDF) and the same input to the KDF, which input is generated using a value uniquely associated with the access type. In this way, the key is tied to the type of the non-3GPP access network and this ensures that the UE and the core network have the same understanding on the type of non-3GPP access network. This will have the advantageous effect of making the system more secure as a non-3GPP access network of one particular type cannot impersonate another non-3GPP access network of a different type.

According, in one aspect there is provided a method for key derivation for non-3GPP access. The method includes determining a particular non-3GPP access type, wherein the particular non-3GPP access type is one of N different particular non-3GPP access type (N>1), and each one of the N particular non-3GPP access types is associated with a unique access type distinguisher value. The method also includes generating a first access network key (e.g., a TNGF key, a N3IWF key, etc.) using a key derivation function and the unique access type distinguisher value with which the determined particular non-3GPP access type is associated, thereby generating a first access network key for the particular non-3GPP access type.

In another aspect there is provided a method for key derivation for non-3GPP access wherein a UE is using a non-3GPP access network to connect to (e.g., register with) a core network, wherein the non-3GPP access network is of a particular non-3GPP access type, wherein the particular non-3GPP access type of the non-3GPP network is one of N different particular non-3GPP access types (N>1), and each one of the N particular non-3GPP access types is associated with a unique access type distinguisher value. The method includes determining the unique access type distinguisher value associated with the particular non-3GPP access type of the non-3GPP access network that the UE is using to connect to the core network. The method also includes generating a first access network key (e.g., a TNGF key, a N3IWF key, etc.) using a key derivation function and the determined unique access type distinguisher value, thereby generating a first access network key for the particular non-3GPP access type.

In some embodiments, the generating step is performed as part of a network registration procedure (e.g., a procedure to register with a 5G core network (5GC)).

In some embodiments, the first access network key is used only for mutual authentication.

In some embodiments, either of the methods is performed by a UE, and the method further comprises: the UE generating a second access network key (e.g., a TNAP key); the UE, prior to generating the access network key, establishing a layer-2 (L2) connection with an access node (e.g., TNAP); and the UE, after generating the first and second access network keys, using the second access network key to establish layer-2 security between the UE and the access node. In some embodiments, using the second access network key to establish layer-2 security between the UE and the access node comprises the UE deriving a master key (e.g., a Pairwise Master Key (PMK)) and using the master key to establish a security context between the access node and the UE, wherein the security context is used to protect traffic transmitted by the UE to the access node and traffic transmitted by the access node to the UE. In some embodiments, the method also includes the UE establishing a control plane connection for transporting control plane traffic (e.g., Non-Access Stratum (NAS)) to a TNGF control plane (TNGF-CP)). In some embodiment the method also includes the UE applying the first access network key as a shared key for mutual authentication.

In some embodiments, either of the methods is performed by a core network mobility management node (CN-MMN) (e.g., AMF or MME), and the method further comprises: i) the CN-MMN, before generating the first access network key, receiving a message transmitted by a control plane function of a non-3GPP access network, wherein the CN-MMN determines the particular non-3GPP access type using information included in the message or the CN-MMN determines the unique access type distinguisher value using information included in the message; and ii) the CN-MMN transmitting the first access network key to the control plane function of the non-3GPP access network.

In some embodiments, either of the methods is performed by a core network mobility management node (CN-MMN) (e.g., AMF or MME), and the CN-MMN uses information associated with a layer 1 or layer 2 connection between the CN-MMN and the non-3GPP access network to: i) determine the unique access type distinguisher value or ii) determine the particular non-3GPP access type. In some embodiments, the method further comprises the CN-MMN transmitting the first access network key to a control plane function of the non-3GPP access network.

In some embodiments, a control plane function uses the first access network key to generate a second access network key (e.g., TNAP key).

BRIEF DESCRIPTION OF THE DRAWINGS

The accompanying drawings, which are incorporated herein and form part of the specification, illustrate various embodiments.

DETAILED DESCRIPTION

Figure 1:
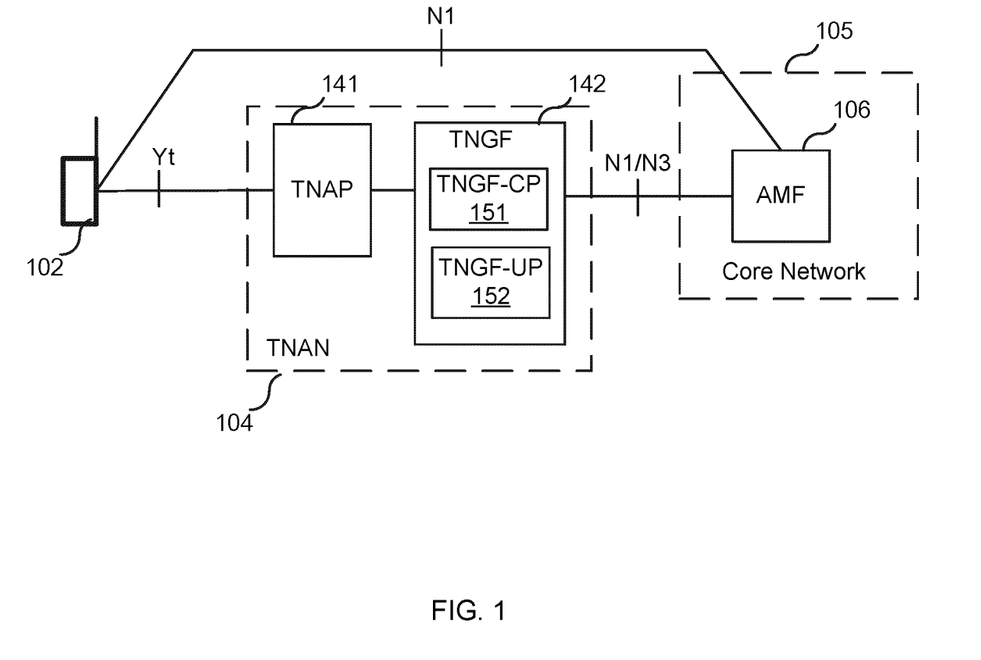
FIG. 1 illustrates a UE accessing a 5G core network (5GC) via a trusted non-3GPP access network (TNAN).
Figure 2:
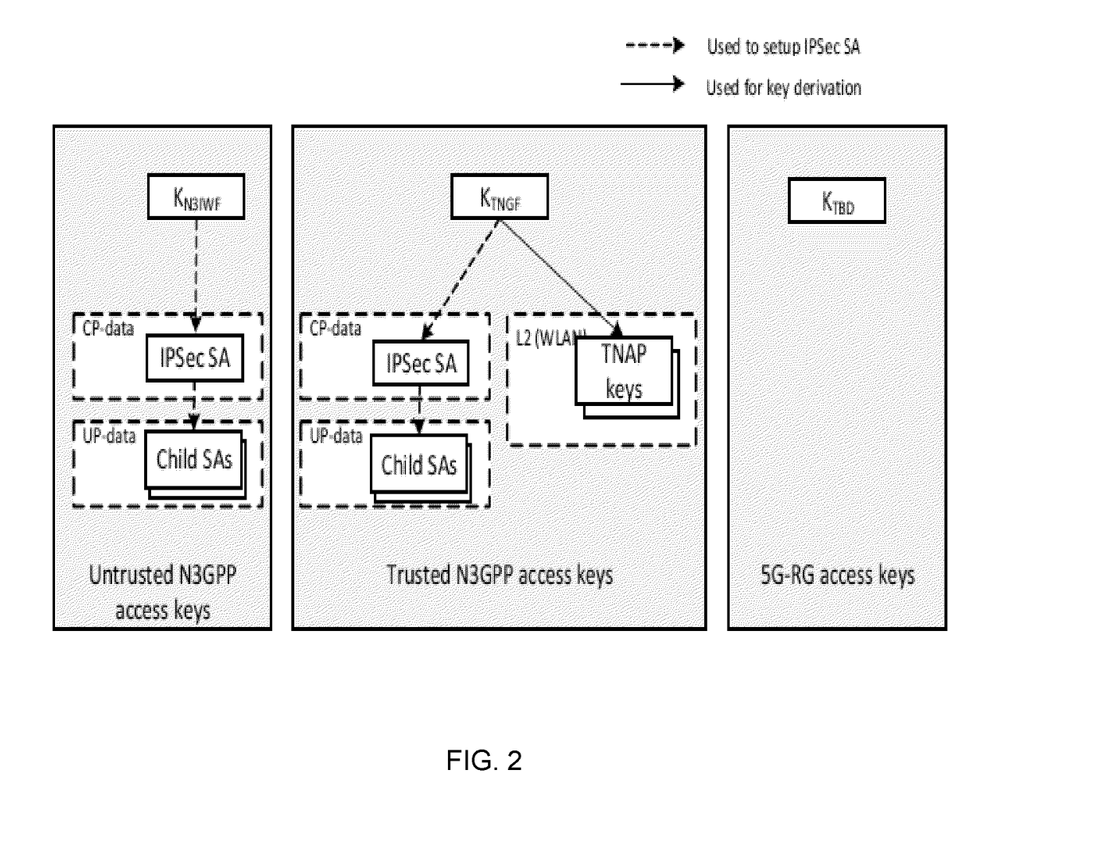
FIG. 2 provides an illustration of the keys needed for different non-3GPP access cases.

FIG. 1 illustrates a UE 102 accessing a 5G core network (5GC) node 106 (e.g., an AMF 106 in core network 105) via a trusted non-3GPP access network (TNAN) 104, which includes an access point 141 (e.g., a Trusted Non-3GPP Access Point (TNAP)) and a gateway function 142 (e.g., a Trusted Non-3GPP Gateway Function (TNGF)). TNGF 142 is functionally split into a control-plane function (TNGF-CP 151) and a user-plane function (TNGF-UP 152). FIG. 2 provides an illustration of the keys needed for different non-3GPP access cases. The key K_TBD for the 5G-RG case is added although no solutions for such key is presently endorsed. This is merely to illustrate that potentially a key may be needed in that case as well.

The current procedure for deriving access network keys K_gNB and K_N3IWF is described in Appendix A.9 of 3GPP TS 33.501. More specifically, Appendix A.9 specifies the parameters that "shall be used to form the input [string (S)] to the [key derivation function (KDF)]" that is used to generate the keys K_gNB and K_N3IWF. According to the TS, the input S to the KDF comprises an input called the "access type distinguisher." Currently, the value of the access type distinguisher can be one of only two different values, as shown in Table 1 below, which is reproduced from TS 33.501.

TABLE 1

| (Table A.9-1 from TS.33.501) Access type distinguishers | |
|---|---|
| Access type distinguisher | Value |
| 3GPP access | 0x01 |
| Non-3GPP access | 0x02 |

As noted in TS 33.501, "[t]he access type distinguisher shall be set to the value for 3GPP (0x01) when deriving KgNB," and "[t]he access type distinguisher shall be set to the value for non-3GPP (0x02) when deriving K_N3IWF."

As described above, the problem with having the same key for all different variants of non-3GPP access is that it could lead to fraud. Accordingly, it is proposed here to derive different keys for different non-3GPP access types. A way to do this is to modify the table in Table A.9-1 in TS.33.501 to hold more values. This is illustrated below in Table 2.

TABLE 2

| New Access type distinguishers | |
|---|---|
| Access type distinguisher | Value |
| 3GPP access | 0x01 |
| Untrusted Non 3GPP access | 0x02 |
| Trusted Non 3GPP access | 0x03 |
| W-5GAN access | 0x04 |

This means that the values (or similar differentiators to distinguish between non-3GPP access types) as described in the table 2 would be taken as input values to the key derivation function in Appendix A.9 of TS 33.501. Other possibilities as differentiators could be for example text strings "trusted" for Trusted Non 3GPP access, and "W-5GAN" for W-5GAN access. In case even further new non-3GPP access types are introduced in the future, the same principle can be applied and a new differentiator can be used for the new non-3GPP access type, e.g. "XX access" would get a differentiator, e.g. next value in the list, i.e. 0x05 or some other differentiator, like string "xx access" which distinguishes it from other non-3GPP access types.

In some embodiments the same principle can be applied to different types of 3GPP access networks, e.g. LTE access network could get its own differentiator.

This would not affect Rel-15. The solution for untrusted non-3GPP access in Rel-15 would work as currently specified.

In order to generate a key based on the non-3GPP access type, the AMF must be able to distinguish between the different non-3GPP access types to be able to derive the separate keys. This information is possible to extract from the N2 security setup between the access node and the AMF, perhaps together with potential pre-configuration of the AMF (identity of trusted nodes). Key separation between the different access network keys will be achieved.

Figure 3:
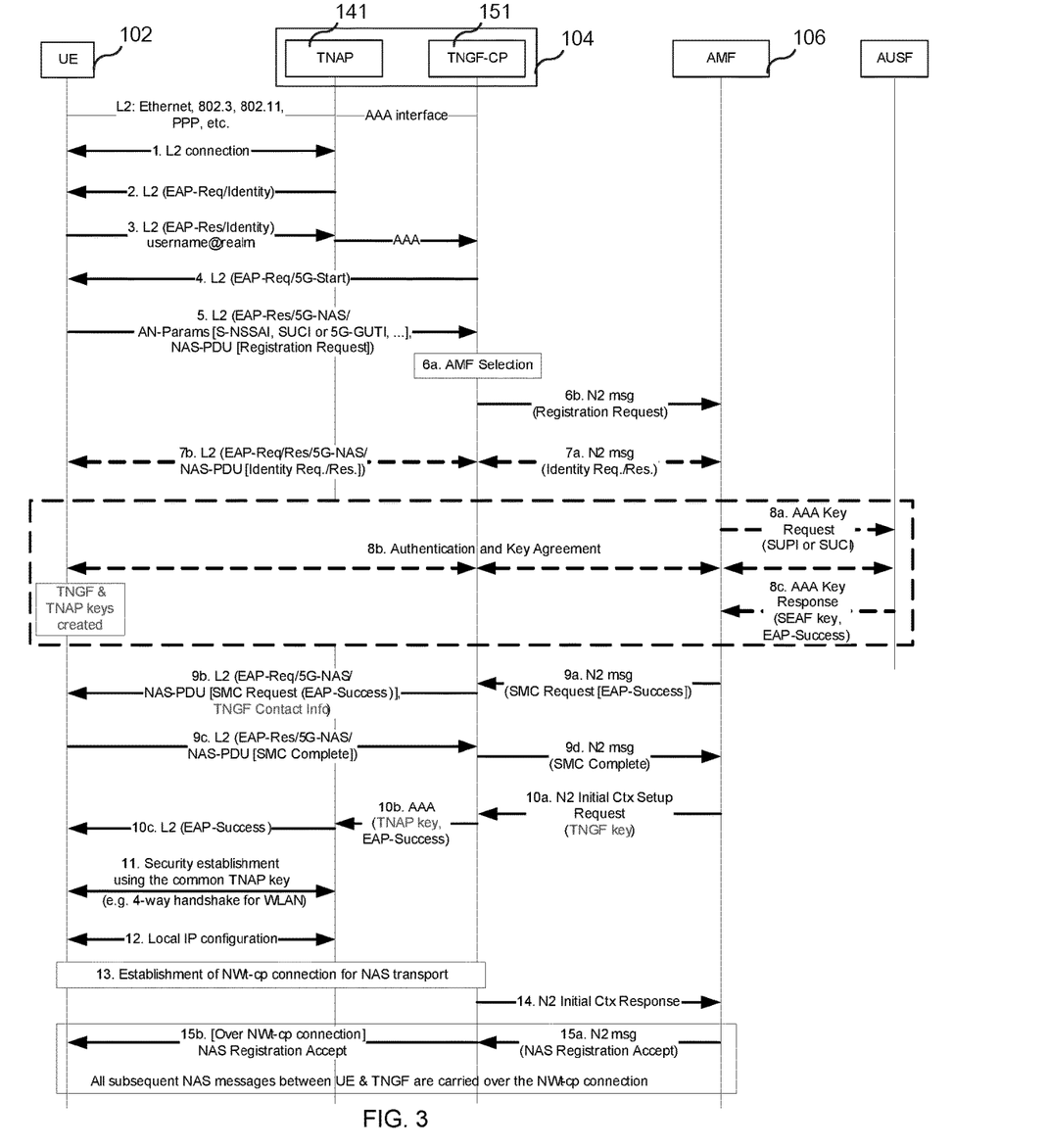
FIG. 3 is a message flow diagram illustrating a registration procedure.

FIG. 3 is a message flow diagram illustrating an example use case in which a UE gains access via TNAN 104. Specifically, FIG. 3 illustrates a UE 102 registering to a 5GC via the TNAN 104 (i.e., registering with AMF 106). As shown, UE 102 registers to 5GC and, at the same time, it authenticates with TNAN 104 by using the EAP-based procedure shown in FIG. 3. This procedure is essentially the same as the registration procedure for untrusted non-3GPP access in TS 23.502, clause 4.12.2.2. The link between UE 102 and TNAN 104 can be any data link (L2) that supports EAP encapsulation, e.g. PPP, PANA (RFC 5191), Ethernet, IEEE 802.3, IEEE 802.11, etc. The interface between TNAP 141 and TNGF-CP 151 is an AAA interface.

Step 1. A layer-2 connection is established between UE 102 and TNAP 141. In case of IEEE 802.11, this step corresponds to an 802.11 Association. In case of PPP, this step corresponds to a PPP LCP negotiation. In other types of non-3GPP access (e.g. Ethernet), this step may not be required.

Steps 2-3. An EAP authentication procedure is initiated. EAP messages are encapsulated into layer-2 packets, e.g. into IEEE 802.3/802.1x packets, into IEEE 802.11/802.1x packets, into PPP packets, etc. UE 102 provides a special NM that triggers TNAP 141 to send an AAA request to TNGF-CP 151, which operates as an AAA proxy. Between TNAP 141 and TNGF-CP the EAP packets are encapsulated into AAA messages.

Steps 4-10. An EAP-5G procedure is executed as specified in TS 23.502, clause 4.12.2.2 with the following modifications:

(1) A TNGF key (instead of an N3IWF key) is created in UE 102 and in AMF 106 after the successful authentication. The TNGF key is derived using the key derivation function of Annex A.9 in TS 33.501 with an input value which is specific to the Trusted access e.g. the "trusted non-3GPP access" value 0x03 as (instead of the more generic value "non-3GPP access" value 0x02). The TNGF key is transferred from the AMF to TNGF-CP in step 10a (within the N2 Initial Context Setup Request). From the TNGF key, TNGF-CP 151 derives a TNAP key, which depends on the non-3GPP access technology used. For example, in case of IEEE 802.11, the TNAP key is a Pairwise Master Key (PMK) and then the TNAP key is transferred from and then from TNGF-CP to TNAP in step 10b (within an AAA message). UE 102 derives the TNGF key and the TNAP key after the successful authentication in step 8.

(2) In step 9b UE 102 receives the "TNGF Contact Info" which includes (a) the IP Address of TNGF-CP to which NAS signaling should be sent and (b) optionally more information that may be used for NAS signaling transport (e.g. a TCP port number, if NAS signaling is transferred over TCP). Alternatively, the "TNGF Contact Info" may be retrieved by UE 102 in step 12, e.g. via DHCP.

If, in step 4, UE 102 does not receive an EAP-Request/ 5G-Start packet, then UE 102 determines that the non-3GPP access network cannot support registration to 5GC. Then, it is up to UE 102 implementation to continue or stop the access authentication procedure.

Step 11. The common TNAP key is used to establish layer-2 security between UE 102 and TNAP. In case of IEEE 802.11, the TNAPBBkey is used to derive an IEEE 802.11 Pairwise Master Key (PMK) and a 4-way handshake is executed (see IEEE 802.11) which establishes a security context between the WLAN AP and UE 102 that is used to protect unicast and multicast traffic over the air.

Step 12. UE 102 receives IP configuration from the TNAN, e.g. with DHCP.

Step 13. At this point UE 102 has successfully connected to the TNAN and has obtained IP configuration. UE 102 uses one of the options defined in clause 7.1.3.4.1 of TR 23.716 to establish an NWt-cp connection (i.e., a connection with TNGF-CP 151 for transporting NAS signalling). When IKEv2/IPsec is used over NWt (as in Option 1 in clause 7.1.3.4.1), then step 13 includes an IKE INIT exchange, followed by an IKE AUTH exchange that applies the TNGF key as a shared key for mutual authentication.

Step 14. After the NWt-cp connection is successfully established, the TNGF responds to AMF with an N2 Initial Context Setup Response message.

Step 15. The NAS Registration Accept message is sent by the AMF and is forwarded to UE via the established NWt-cp connection. Now UE 102 can use the TNAN to (a) transfer non-seamless offload traffic and (b) establish one or more PDU sessions.

From UE point of view, the following steps may be performed. UE 102 initiates a registration procedure to register with a 5G core network 105 via a non-3GPP access network. UE 102 determines the type of the access network that is being used to connect UE 102 with the 5G core network (e.g. UE 102 determines whether the access network is a trusted non-3GPP access network, a W-5GAN, or an untrusted non-3GPP access network). UE 102 may run authentication with the 5G core network or there may be an existing NAS security context. When it is time to derive the access network (AN) key to be used for protecting the access network traffic (control plane and/or user plane), UE 102 derives an AN key which is specific to the type of the non-3GPP access network. That is, depending on the type of the non-3GPP access network, a different input value is used in the key derivation function deriving the AN key.

From AMF point of view, the following steps may be performed. The AMF in the 5G core network detects that a UE is connecting via a non-3GPP access network to the AMF. The AMF determines the type of the non-3GPP access network (e.g. is it a trusted non-3GPP, W-5GAN or untrusted non-3GPP access network). The AMF may run authentication with UE 102 or there may be an existing NAS security context. When it is time to derive the AN key to be used for protecting the access network traffic, the AMF derives an AN key which is specific to the type of the non-3GPP access network. That is, depending on the type of the non-3GPP access network, a different input value is used in the key derivation function deriving the AN key. The AMF sends the derived AN key to an access network node (e.g., a gateway handling the access network traffic). In another embodiment, the network is a EPS/LTE network and the MME is used instead of the AMF.

Figure 4:
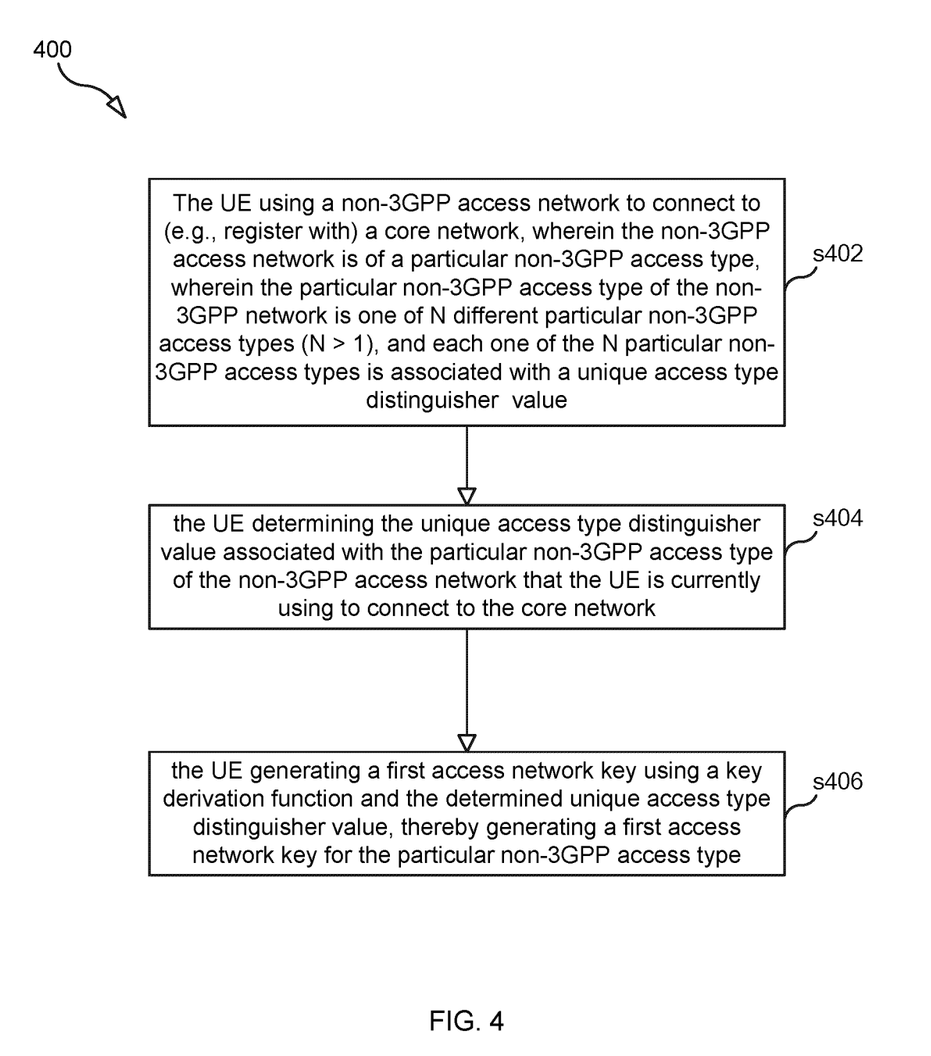
FIG. 4 is a flow chart illustrating an embodiment.

FIG. 4 is a flow chart illustrating a process 400, according to an embodiment, for key derivation. Process 400 may be performed by UE 102 and begin in step s402.

Step s402 comprises UE 102 using a non-3GPP access network to connect to (e.g., register with) a core network, wherein the non-3GPP access network is of a particular non-3GPP access type, wherein the particular non-3GPP access type of the non-3GPP network is one of N different particular non-3GPP access types (N>1), and each one of the N particular non-3GPP access types is associated with a unique access type distinguisher value.

Step s404 comprises UE 102 determining the unique access type distinguisher value associated with the particular non-3GPP access type of the non-3GPP access network that UE 102 is currently using to connect to the core network.

Step s406 comprises UE 102 generating a first access network key (e.g., a TNGF key, a N3IWF key, etc.) using a key derivation function and the determined unique access type distinguisher value, thereby generating a first access network key for the particular non-3GPP access type.

In some embodiments, the generating step (step s406) is performed as part of a network registration procedure (e.g., a procedure to register with a 5G core network (5GC)).

In some embodiments, the first access network key is used only for mutual authentication.

In some embodiments, process 400 further comprises: UE 102, prior to generating the first access network key, establishing a layer-2 (L2) connection with an access node (e.g., TNAP); UE 102 generating a second access network key (e.g., a TNAP key); UE 102, after generating the first and second access network keys, using the second access network key to establish layer-2 security between UE 102 and the access node. In some embodiments, using the second access network key to establish the layer-2 security between UE 102 and the access node comprises UE 102 deriving a master key (e.g., a Pairwise Master Key (PMK)) and using the master key to establish a security context between the access node and UE 102, wherein the security context is used to protect traffic transmitted by UE 102 to the access node and traffic transmitted by the access node to UE 102. In some embodiments, process 400 also includes UE 102 establishing a control plane connection for transporting control plane traffic (e.g., Non-Access Stratum (NAS)) to a TNGF control plane (TNGF-CP) and UE 102 applying the first access network key as a shared key for mutual authentication.

Figure 5:
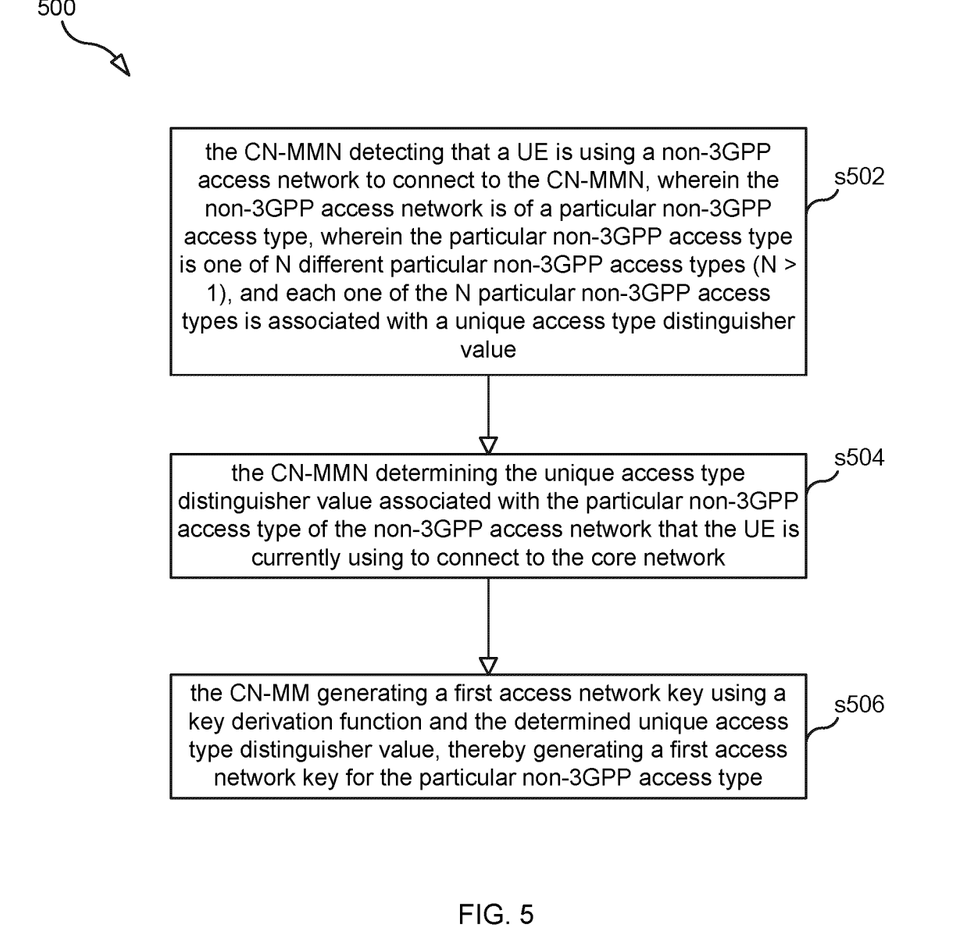
FIG. 5 is a flow chart illustrating an embodiment.

FIG. 5 is a flow chart illustrating a process 500, according to an embodiment, for key derivation. Process 500 may be performed by a core network mobility management node (CN-MMN) (e.g., an MME or an AMF) and may begin in step s502.

Step s502 comprises the CN-MMN detecting that a UE is using a non-3GPP access network to connect to the CN-MMN, wherein the non-3GPP access network is of a particular non-3GPP access type, wherein the particular non-3GPP access type is one of N different particular non-3GPP access types (N>1), and each one of the N particular non-3GPP access types is associated with a unique access type distinguisher value.

Step s504 comprises the CN-MMN determining the unique access type distinguisher value associated with the particular non-3GPP access type of the non-3GPP access network that UE 102 is currently using to connect to the core network.

Step s506 comprises the CN-MMN generating a first access network key (e.g., a TNGF key, a N3IWF key, etc.) using a key derivation function and the determined unique access type distinguisher value, thereby generating a first access network key for the particular non-3GPP access type.

In some embodiments, process 500 further comprises: the CN-MMN, before generating the first access network key, receiving a message transmitted by a control plane function of the non-3GPP access network, wherein the CN-MMN determines the unique access type distinguisher value using information included in the message.

In some embodiments, the CN-MMN uses information associated with a layer 1 or layer 2 connection between the CN-MMN and the non-3GPP access network to: i) determine the unique access type distinguisher value or ii) determine the particular non-3GPP access type.

In some embodiments, process 500 further includes the CN-MMN transmitting the first access network key to the control plane function of the non-3GPP access network. In some embodiments, the control plane function uses the first access network key to generate a second access network key (e.g., TNAP key).

Figure 6:
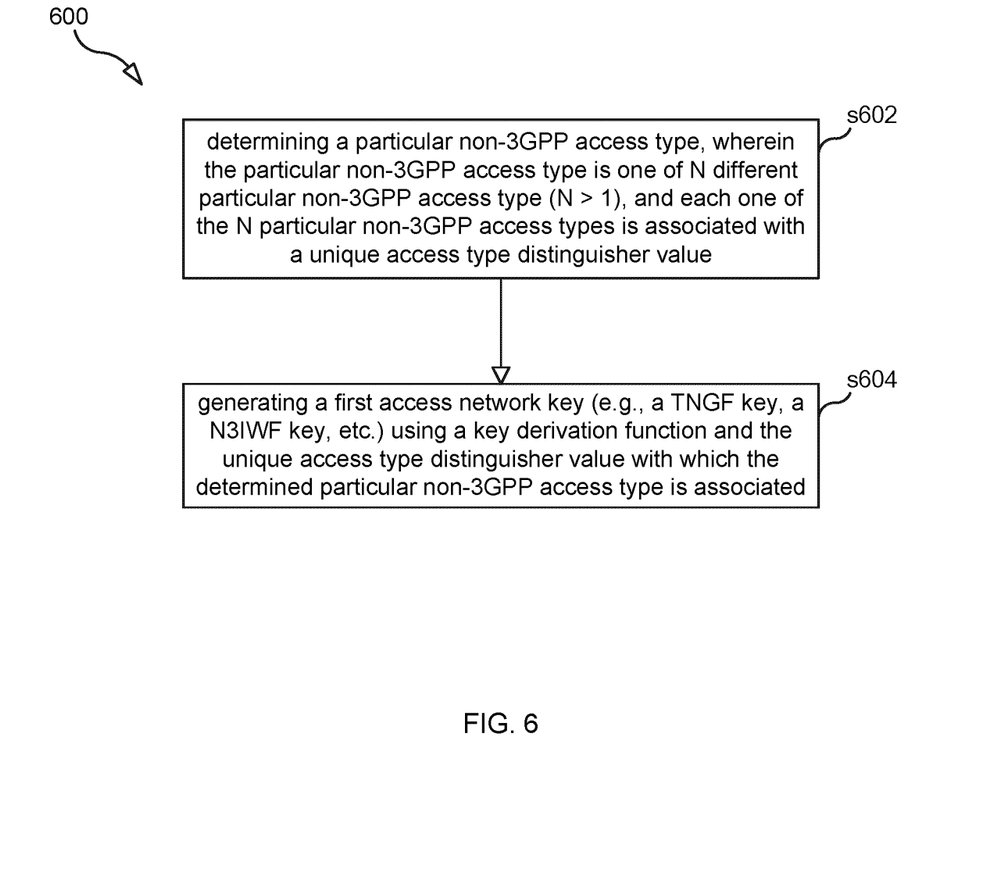
FIG. 6 is a flow chart illustrating an embodiment.

FIG. 6 is a flow chart illustrating a process 600, according to an embodiment, for key derivation. Process 600 may be performed by a CN-MMN (e.g., an MME or an AMF) or a UE and may begin in step s602.

Step s602 comprises determining a particular non-3GPP access type, wherein the particular non-3GPP access type is one of N different particular non-3GPP access type (N>1), and each one of the N particular non-3GPP access types is associated with a unique access type distinguisher value.

Steps s604 comprises generating a first access network key (e.g., a TNGF key, a N3IWF key, etc.) using a key derivation function and the unique access type distinguisher value with which the determined particular non-3GPP access type is associated, thereby generating a first access network key for the particular non-3GPP access type.

Figure 7:
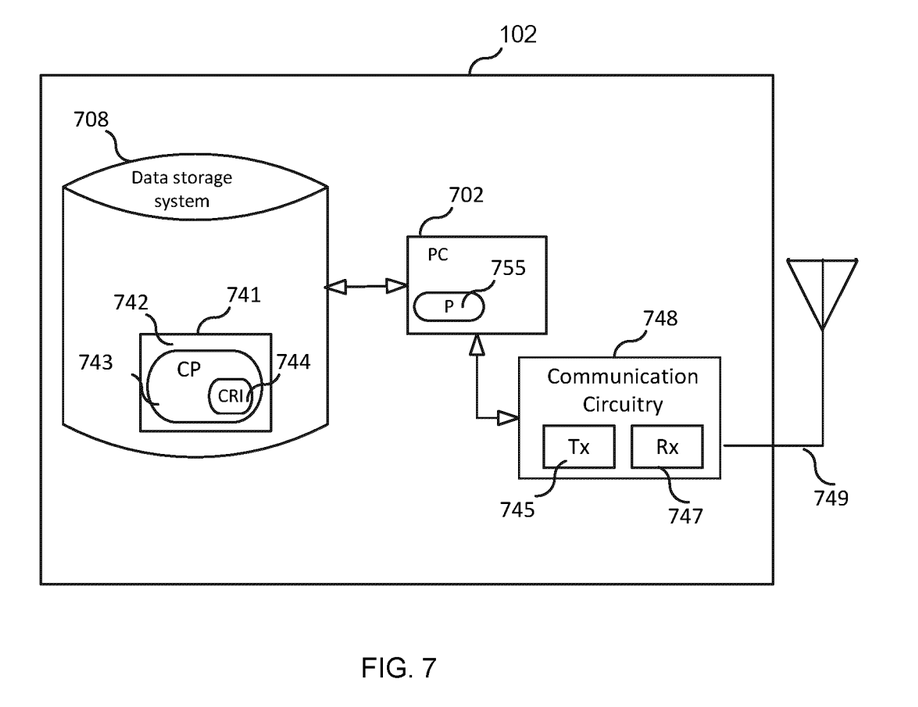
FIG. 7 is a block diagram illustrating a UE according to an embodiment.

FIG. 7 is a block diagram of UE 102, according to some embodiments. As shown in FIG. 7, UE 102 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like); communication circuitry 748, which is coupled to an antenna arrangement 749 comprising one or more antennas and which comprises a transmitter (Tx) 745 and a receiver (Rx) 747 for enabling UE 102 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes UE 102 to perform steps described herein (e.g., steps described herein with reference to the flow charts). In other embodiments, UE 102 may be configured to perform steps described herein without the need for code. That is, for example, PC 702 may consist merely of one or more ASICs. Hence, the features of the embodiments described herein may be implemented in hardware and/or software.

Figure 8:
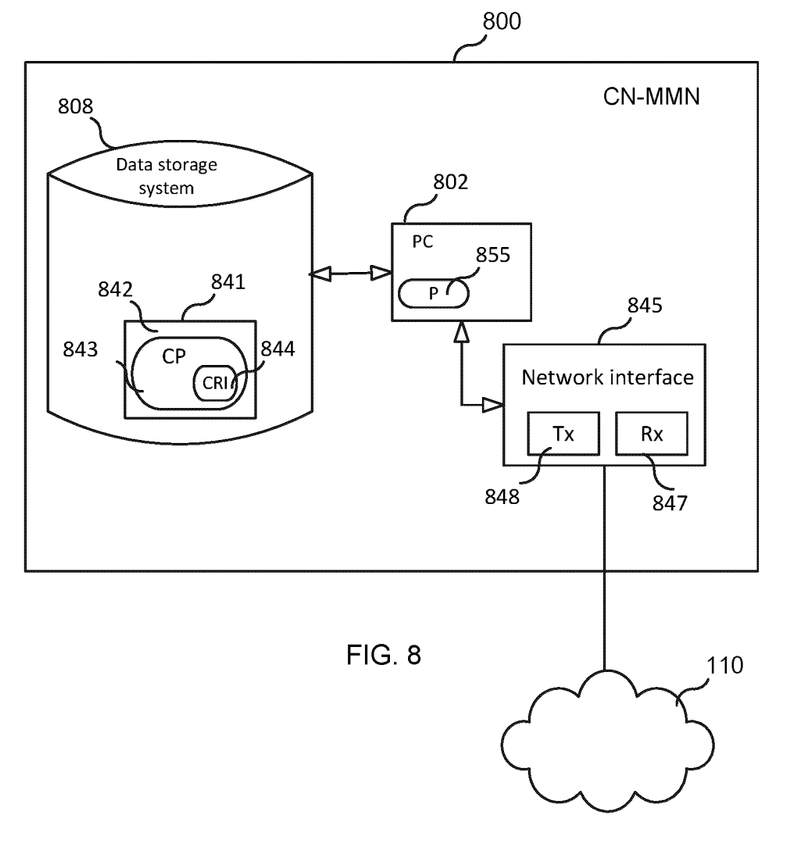
FIG. 8 is a block diagram illustrating a CN-MMN according to an embodiment.

FIG. 8 is a block diagram of a CN-MMN 800 (e.g., AMF 106 or an MME). As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected; and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software.

Embodiments

A1. A method for key derivation for non-3GPP access, the method comprising: determining a particular non-3GPP access type, wherein the particular non-3GPP access type is one of N different particular non-3GPP access type (N>1), and each one of the N particular non-3GPP access types is associated with a unique access type distinguisher value; generating a first access network key (e.g., a TNGF key, a N3IWF key, etc.) using a key derivation function and the unique access type distinguisher value with which the determined particular non-3GPP access type is associated, thereby generating a first access network key for the particular non-3GPP access type.

A2. A method for key derivation for non-3GPP access wherein a user equipment, UE (102), is using a non-3GPP access network to connect to (e.g., register with) a core network, wherein the non-3GPP access network is of a particular non-3GPP access type, wherein the particular non-3GPP access type of the non-3GPP network is one of N different particular non-3GPP access types (N>1), and each one of the N particular non-3GPP access types is associated with a unique access type distinguisher value, the method comprising: determining the unique access type distinguisher value associated with the particular non-3GPP access type of the non-3GPP access network that the UE (102) is using to connect to the core network; and generating a first access network key (e.g., a TNGF key, a N3IWF key, etc.) using a key derivation function and the determined unique access type distinguisher value, thereby generating a first access network key for the particular non-3GPP access type.

A3. The method of embodiment A1 or A2, wherein the generating step is performed as part of a network registration procedure (e.g., a procedure to register with a 5G core network (5GC)).

A4. The method of embodiment A1 or A2 or A3, wherein the first access network key is used only for mutual authentication.

A5. The method of any one of embodiments A1-A4, wherein the method is performed by a UE, and the method further comprises: the UE generating a second access network key (e.g., a TNAP key); the UE, prior to generating the access network key, establishing a layer-2 (L2) connection with an access node (e.g., TNAP); and the UE, after generating the first and second access network keys, using the second access network key to establish layer-2 security between the UE and the access node.

A6. The method of embodiment A5, wherein using the second access network key to establish layer-2 security between the UE and the access node comprises the UE deriving a master key (e.g., a Pairwise Master Key (PMK)) and using the master key to establish a security context between the access node and the UE, wherein the security context is used to protect traffic transmitted by the UE to the access node and traffic transmitted by the access node to the UE.

A7. The method of embodiments A5 or A6, further comprising the UE establishing a control plane connection for transporting control plane traffic (e.g., Non-Access Stratum (NAS)) to a TNGF control plane (TNGF-CP)).

A8. The method of embodiment A7, further comprising the UE applying the first access network key as a shared key for mutual authentication.

A9. The method of any one of embodiments A1-A4, wherein the method is performed by a core network mobility management node (CN-MMN) (e.g., AMF or MME), and the method further comprises: the CN-MMN, before generating the first access network key, receiving a message transmitted by a control plane function of a non-3GPP access network, wherein the CN-MMN determines the particular non-3GPP access type using information included in the message or the CN-MMN determines the unique access type distinguisher value using information included in the message; and the CN-MMN transmitting the first access network key to the control plane function of the non-3GPP access network.

A10. The method of any one of embodiments A1-A4, wherein the method is performed by a core network mobility management node (CN-MMN) (e.g., AMF or MME), the CN-MMN uses information associated with a layer 1 or layer 2 connection between the CN-MMN and the non-3GPP access network to: i) determine the unique access type distinguisher value or ii) determine the particular non-3GPP access type, and the method further comprises the CN-MMN transmitting the first access network key to a control plane function of the non-3GPP access network.

A11. The method of any one of embodiments A9-A10, further comprising a control plane function using the first access network key to generate a second access network key (e.g., TNAP key).

B1. An apparatus (e.g., UE 102 or CN-MMN 800) for key derivation for non-3GPP access, the apparatus being adapted to: determine a particular non-3GPP access type, wherein the particular non-3GPP access type is one of N different particular non-3GPP access type (N>1), and each one of the N particular non-3GPP access types is associated with a unique access type distinguisher value; generate a first access network key (e.g., a TNGF key, a N3IWF key, etc.) using a key derivation function and the unique access type distinguisher value with which the determined particular non-3GPP access type is associated, thereby generating a first access network key for the particular non-3GPP access type.

B2. An apparatus (e.g., UE 102 or CN-MMN 800) for key derivation for non-3GPP access, the apparatus being adapted to: determine a unique access type distinguisher value associated with a particular non-3GPP access type of a non-3GPP access network that a UE (102) is using to connect to a core network; and generate a first access network key (e.g., a TNGF key, a N3IWF key, etc.) using a key derivation function and the determined unique access type distinguisher value, thereby generating a first access network key for the particular non-3GPP access type.

B3. The apparatus of embodiment B1 or B2, wherein the apparatus is further adapted to perform the steps of any one of embodiments A3-11.

C1. A computer program, comprising instructions which, when executed on at least one processor, cause the at least one processor to carry out the method according to any one of embodiments A1-A11.

C2. A carrier containing the computer program of embodiment C1, wherein the carrier is one of an electronic signal, optical signal, radio signal, or computer readable storage medium.

While various embodiments are described herein (including the attached appendices which contain proposals to modify a 3GPP standard), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment, UE, for key derivation for non-3GPP access, the method comprising:
   determining a particular non-3GPP access type, the particular non-3GPP access type being one of N different particular non-3GPP access types (N>1), and each one of the N particular non-3GPP access types being associated with a unique access type distinguisher value; and
   generating a first access network key using a key derivation function and the unique access type distinguisher value with which the determined particular non-3GPP access type is associated, thereby generating a first access network key for the particular non-3GPP access type;
   generating a second access network key, the second access network key being a Trusted Non-3GPP Access Point, TNAP;
   prior to generating the first access network key, establishing a layer-2, L2, connection with an access node; and
   after generating the first and second access network keys, using the second access network key to establish L2 security between the UE and the access node.

2. The method of claim 1, wherein generating a first access network key is performed as part of a network registration procedure.

3. The method of claim 1, wherein the first access network key is used only for mutual authentication.

4. The method of claim 1, wherein using the second access network key to establish layer-2 security between the UE and the access node comprises the UE deriving a master key and using the master key to establish a security context between the access node and the UE, wherein the security context is used to protect traffic transmitted by the UE to the access node and traffic transmitted by the access node to the UE.

5. The method of claim 1, further comprising the UE establishing a control plane connection for transporting control plane traffic.

6. The method of claim 5, further comprising the UE applying the first access network key as a shared key for mutual authentication.

7. The method of claim 1, wherein
   the method is performed by a core network mobility management node, CN-MMN, and
   the method further comprises:
   the CN-MMN, before generating the first access network key, receiving a message transmitted by a control plane function of a non-3GPP access network, wherein the CN-MMN determines the particular non-3GPP access type using information included in the message or the CN-MMN determines the unique access type distinguisher value using information included in the message; and
   the CN-MMN transmitting the first access network key to the control plane function of the non-3GPP access network.

8. The method of claim 7, further comprising a control plane function using the first access network key to generate a second access network key.

9. The method of claim 1, wherein
   the method is performed by a core network mobility management node, CN-MMN, the CN-MMN uses information associated with a layer 1 or layer 2 connection between the CN-MMN and the non-3GPP access network to: i) determine the unique access type distinguisher value or ii) determine the particular non-3GPP access type, and
   the method further comprises the CN-MMN transmitting the first access network key to a control plane function of the non-3GPP access network.

10. A method for key derivation for non-3GPP access wherein a user equipment, UE, is using a non-3GPP access network to connect to a core network, the non-3GPP access network being of a particular non-3GPP access type, the particular non-3GPP access type of the non-3GPP network being one of N different particular non-3GPP access types (N>1), and each one of the N particular non-3GPP access types being associated with a unique access type distinguisher value, the method comprising:
   determining the unique access type distinguisher value associated with the particular non-3GPP access type of the non-3GPP access network that the UE is using to connect to the core network;
   generating a first access network key using a key derivation function and the determined unique access type distinguisher value, thereby generating a first access network key for the particular non-3GPP access type;

generating a second access network key, the second access network key being a Trusted Non-3GPP Access Point, TNAP;

prior to generating the first access network key, establishing a layer-2, L2, connection with an access node; and after generating the first and second access network keys, using the second access network key to establish L2 security between the UE and the access node.

11. The method of claim 10, wherein the first access network key is used only for mutual authentication.

12. The method of claim 10, wherein using the second access network key to establish layer-2 security between the UE and the access node comprises the UE deriving a master key and using the master key to establish a security context between the access node and the UE, wherein the security context is used to protect traffic transmitted by the UE to the access node and traffic transmitted by the access node to the UE.

13. The method of claim 10, wherein the method is performed by a core network mobility management node, CN-MMN, and the method further comprises:

the CN-MMN, before generating the first access network key, receiving a message transmitted by a control plane function of a non-3GPP access network, wherein the CN-MMN determines the particular non-3GPP access type using information included in the message or the CN-MMN determines the unique access type distinguisher value using information included in the message; and the CN-MMN transmitting the first access network key to the control plane function-of the non-3GPP access network.

14. The method of claim 10, wherein the method is performed by a core network mobility management node, CN-MMN, the CN-MMN uses information associated with a layer 1 or layer 2 connection between the CN-MMN and the non-3GPP access network to: i) determine the unique access type distinguisher value or ii) determine the particular non-3GPP access type, and the method further comprises the CN-MMN transmitting the first access network key to a control plane function of the non-3GPP access network.

15. The method of claim 14, further comprising a control plane function using the first access network key to generate a second access network key.

16. An apparatus for key derivation for non-3GPP access, the apparatus being adapted to:

determine a particular non-3GPP access type, the particular non-3GPP access type being one of N different particular non-3GPP access type (N>1), and each one of the N particular non-3GPP access types being associated with a unique access type distinguisher value;

generate a first access network key using a key derivation function and the unique access type distinguisher value with which the determined particular non-3GPP access type is associated, thereby generating a first access network key for the particular non-3GPP access type;

generate a second access network key, the second access network key being a Trusted Non-3GPP Access Point, TNAP;

prior to generating the first access network key, establish a layer-2, L2, connection with an access node; and after generating the first and second access network keys, use the second access network key to establish L2 security between the apparatus and the access node.

17. The apparatus of claim 16, wherein using the second access network key to establish layer-2 security between the UE and the access node comprises the UE deriving a master key and using the master key to establish a security context between the access node and the UE, wherein the security context is used to protect traffic transmitted by the UE to the access node and traffic transmitted by the access node to the UE.

18. The apparatus of claim 16, wherein the apparatus comprises a core network mobility management node, CN-MMN, and the CN-MMN is further configured to:

before generating the first access network key, receive a message transmitted by a control plane function of a non-3GPP access network, wherein the CN-MMN-determines the particular non-3GPP access type using information included in the message or the CN-MMN determines the unique access type distinguisher value using information included in the message; and transmit the first access network key to the control plane function-of the non-3GPP access network.

19. The apparatus of claim 16, wherein the apparatus comprises a core network mobility management node, CN-MMN, and the CN-MMN uses information associated with a layer 1 or layer 2 connection between the CN-MMN and the non-3GPP access network to: i) determine the unique access type distinguisher value or ii) determine the particular non-3GPP access type, and the apparatus is further configured to transmit the first access network key to a control plane function of the non-3GPP access network.

20. An apparatus for key derivation for non-3GPP access, the apparatus being adapted to:

determine a unique access type distinguisher value associated with a particular non-3GPP access type of a non-3GPP access network that a UE is using to connect to a core network; and generate a first access network key using a key derivation function and the determined unique access type distinguisher value, thereby generating a first access network key for the particular non-3GPP access type;

generate a second access network key, the second access network key being a Trusted Non-3GPP Access Point, TNAP;

prior to generating the first access network key, establish a layer-2, L2, connection with an access node; and after generating the first and second access network keys, use the second access network key to establish L2 security between the apparatus and the access node.

21. The apparatus of claim 20, wherein using the second access network key to establish layer-2 security between the UE and the access node comprises the UE deriving a master key and using the master key to establish a security context between the access node and the UE, wherein the security context is used to protect traffic transmitted by the UE to the access node and traffic transmitted by the access node to the UE.

22. The apparatus of claim 20, wherein the apparatus comprises a core network mobility management node, CN-MMN, and the apparatus is further configured to:

before generating the first access network key, receive a message transmitted by a control plane function of a non-3GPP access network, wherein the CN-MMN-determines the particular non-3GPP access type using information included in the message or the CN-MMN determines the unique access type distinguisher value using information included in the message; and transmit the first access network key to the control plane function-of the non-3GPP access network.

23. The apparatus of claim 20, wherein the apparatus comprises a core network mobility management node, CN-MMN, wherein the CN-MMN uses information associated with a layer 1 or layer 2 connection between the CN-MMN and the non-3GPP access network to: i) determine the unique access type distinguisher value or ii) determine the particular non-3GPP access type, and the apparatus is further configured to transmit the first access network key to a control plane function of the non-3GPP access network.

* * * * *